United States Patent [19]
Ratgeber et al.

[11] Patent Number: 5,873,520
[45] Date of Patent: Feb. 23, 1999

[54] CONTROL UNIT FOR A VEHICLE HEATING OR AIR-CONDITIONING SYSTEM

[75] Inventors: Gerhard Ratgeber; Anna Roth, both of München; Wolfgang Schmidt, Neuburg; Bernhard Neubert, München; Hariolf Gentner, München; Norbert Schicktanz, München, all of Germany

[73] Assignee: Bayerische Motoren Werke Aktiengesellschaft, Munich, Germany

[21] Appl. No.: 815,713

[22] Filed: Mar. 12, 1997

[30] Foreign Application Priority Data

Mar. 12, 1996 [DE] Germany .......................... 196 09 589.1
Mar. 15, 1996 [DE] Germany .......................... 196 10 148.4

[51] Int. Cl.$^6$ ...................................................... F24F 7/00
[52] U.S. Cl. ........................... 236/94; 165/203; 165/204; 62/244; 62/186; 236/49.3
[58] Field of Search ................................ 236/91 R, 91 E, 236/91 C, 49.3, 94; 62/180, 186, 244, 126, 127; 165/203, 202, 204, 205, 11.1; 454/75

[56] References Cited

U.S. PATENT DOCUMENTS

| 4,165,782 | 8/1979 | Kumagai ................................. 165/11 |
| 4,537,245 | 8/1985 | Nishimura et al. ..................... 165/203 |
| 5,607,105 | 3/1997 | Samukawa et al. .................. 62/186 X |

FOREIGN PATENT DOCUMENTS

| 199916B1 | 12/1986 | European Pat. Off. . |
| 3409321 | 9/1985 | Germany . |
| 4017895 | 11/1991 | Germany . |

OTHER PUBLICATIONS

WO9630225A1, Abstract Only, 1996.
DE4337240A1, Abstract Only, 1995.
EP605324A1, Abstract Only, 1994.
DE4017895C, Abstract Only, 1990.
DE3640608A, Abstract Only, 1986.
EP155913B, Abstract Only, 1985.
JP2092713, Mar. 4, 1990, Patent Abstracts of Japan.
JP59145615, Aug. 21, 1984, Patent Abstracts of Japan.

*Primary Examiner*—Harry B. Tanner
*Attorney, Agent, or Firm*—Evenson, McKeown, Edwards & Lenahan, P.L.L.C.

[57] ABSTRACT

In the case of a control unit for a vehicle heating or air-conditioning unit having a vehicle-borne monitor permitting access to different display and control menus, in addition to a selection possibility for an automatic program by way of an automatic key, an individual adjusting possibility is provided for the temperature distribution and/or air distribution in different zones of the vehicle interior which can be displayed and selected on the vehicle-borne monitor. The different zones of the vehicle interior can be selected by way of a control element by means of a symbolic representation on the vehicle-borne monitor. An air quantity selector is provided which is arranged in a hidden manner with respect to a temperature selector constructed as a rotary-type knob. For this purpose, a rotary-type knob for the air quantity is provided concentrically with respect to the rotary-type knob for the temperature adjustment and is normally recessed with respect to this rotary-type knob and can be brought into a protruding position with respect to it.

14 Claims, 2 Drawing Sheets

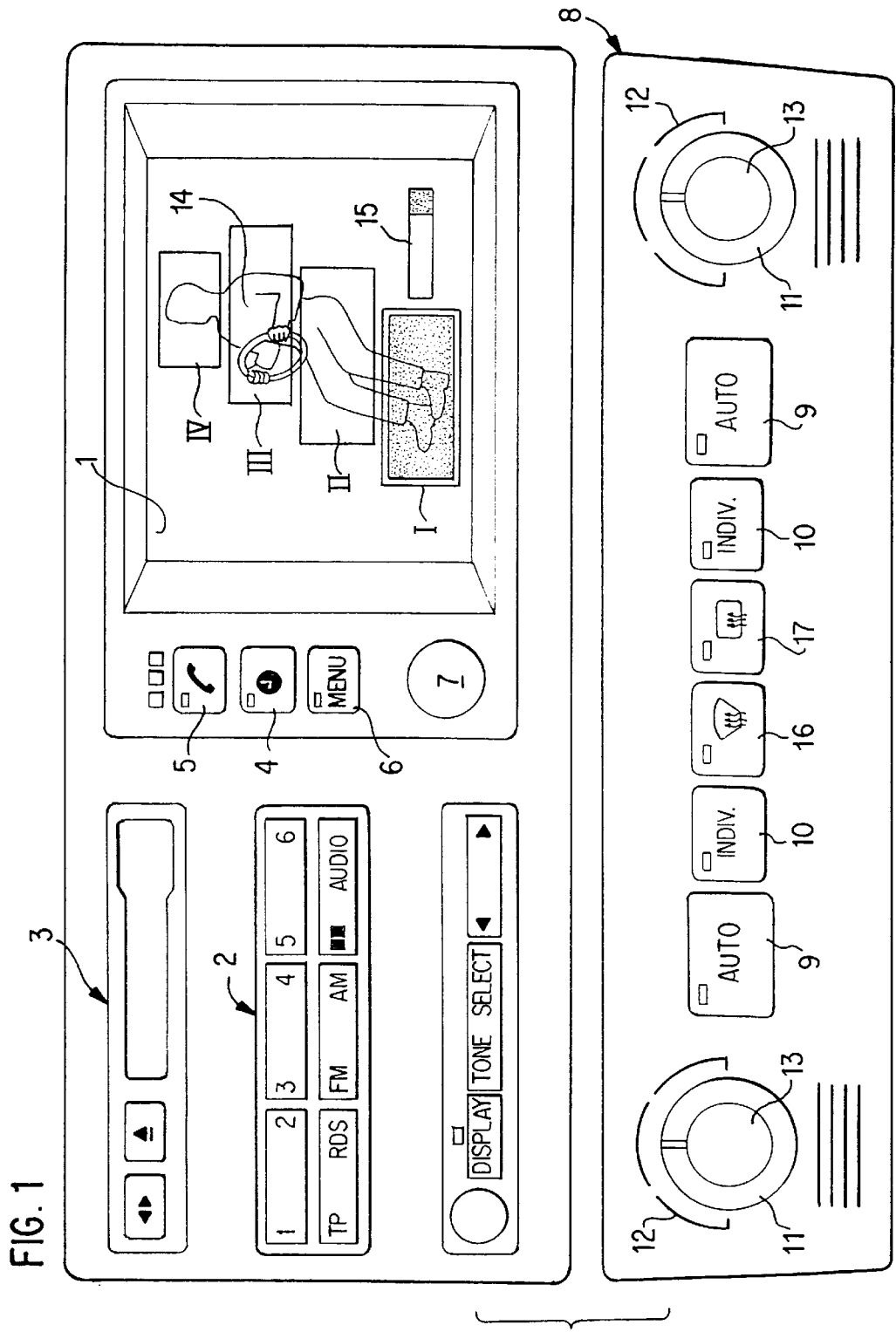

CONTROL UNIT FOR A VEHICLE HEATING OR AIR-CONDITIONING SYSTEM

BACKGROUND AND SUMMARY OF THE INVENTION

This application claims the priority of German priority application 196 09 589.1, filed in Germany on Mar. 12, 1996, and German priority application 196 10 148.4, filed in Germany on Mar. 15, 1996, the disclosures of which are expressly incorporated by reference herein.

This invention relates to a control unit for a vehicle heating or air-conditioning system having a vehicle-borne monitor which permits access to different display and control menus. European Patent Document EP 0 199 916 B1 describes a central control input and information output for accessories of vehicles; that is, a so-called vehicle-borne monitor. This document also contains information about operating a vehicle climate control unit by means of such a vehicle-borne monitor. However, the document supplies no details in this respect.

German Patent Document DE 34 09 321 contains a conventional control unit for a vehicle heating and air-conditioning system which, although it has multiple adjusting possibilities, is confusing because of the large number of control knobs. However, such a control unit should, on the one hand, offer many adjusting possibilities but, on the other hand, be easy to operate, particularly when, while driving, the driver of a motor vehicle wants to make changes on the control unit.

It is therefore an object of this invention to provide an easily and nevertheless multiply adjustable control unit for a vehicle heating or air-conditioning system having a vehicle-borne monitor.

For achieving this object, it is provided that, in addition to the selection possibility for an automatic program, an individual adjusting possibility is provided for the temperature distribution and/or air distribution in various zones of the vehicle interior which can be displayed on the vehicle-borne monitor and selected.

According to the invention, an automatic program is provided first which is customary in the case of modern vehicle heating or air-conditioning systems. As a function of a selected temperature—as in any customary heating or air-conditioning system, a temperature selector is provided for this purpose—, this automatic program controls the air distribution and the temperature distribution in the vehicle interior, also while taking into account current actual temperatures in a basically favorable manner which, however, must not be optimal for every vehicle occupant. On the contrary, sensitivity with respect to temperature varies among people so that there are vehicle occupants who desire a temperature distribution or air distribution other than the one provided by the automatic program. For this reason—and this is also known prior art—, an individual adjusting possibility for the distribution of temperature and/or air is provided. According to the invention, this individual adjusting possibility is now implemented by means of the vehicle borne monitor, in which case so-called zones can be displayed and selected on the vehicle-borne monitor in which the temperature distribution and/or the air distribution can be adjusted. Preferred zones of this type are the head area of a vehicle occupant, the foot space, the chest area as well as optionally the seat area.

In order to be able to easily recognize these zones on the vehicle-borne monitor, a symbolic representation, preferably in the form of the symbol of a sitting vehicle occupant, may be provided. In this case, the different zones can be marked relative to the vehicle occupant. It will then be possible to select the respective desired zone by means of a control element, such as a rotary-type knob or a slider control device. After the selection of a zone, preferably the temperature can be adjusted, for example, also by means of a simple rotary-type knob, for this zone.

Also in this case, a particularly simple strategy can be used which the user or operator can easily understand and according to which preferably only the temperature in the vehicle interior or in a portion thereof is adjusted. The above-mentioned automatic program can then automatically set the most favorable air quantity and air distribution. However, based on its principle, a hot-air heater, in contrast to a convection heater customary in living spaces, requires that also the air quantity is varied when a vehicle occupant indicates that he wants a higher temperature. Particularly while the current inside temperature is taken into account but also as a function of the respective ambient temperature, this respective, most favorable air quantity is indicated by the automatic program. The vehicle occupant therefore does not have to bother with the adjustment of the respective most favorable air quantity, which results in a high operating comfort.

However, in certain cases, a vehicle occupant may want an air quantity which differs from that indicated in the automatic program. For this purpose, the vehicle occupant is provided with the possibility of either trimming the automatic program; that is, of superimposing an air quantity difference on the program, or of indicating a separate air quantity wish completely independently of the automatic program. In the state of the art described in the above-mentioned German Patent Document DE 34 09 321, separate keys are provided for this purpose which are normally hidden behind a cover and are accessible only after the cover has been folded away. Since, for adjusting a separate desired air quantity volume, several hand movements are required in the case of this known control unit, according to an advantageous further development of the invention, a particularly advantageous adjusting possibility for the air quantity can be provided. However, for reasons of clarity, the temperature adjustment should have preference. It is therefore suggested that an air quantity selector be arranged in a hidden manner with respect to a temperature selector. For this purpose, a rotary-type knob for the air quantity can be provided concentrically with respect to a rotary-type knob for the temperature adjustment and is normally recessed with respect to the rotary-type temperature adjusting knob. The rotary-type air quantity control knob can be brought into a position in which it protrudes with respect to the rotary-type temperature adjusting knob only after a corresponding operation, such as a pressure exercised on the rotary type button.

Other objects, advantages and novel features of the present invention will become apparent from the following detailed description of the invention when considered in conjunction with the accompanying drawings.

BRIEF DESCRIPTION OF THE DRAWINGS

FIG. 1 is a top frontal view of a control unit constructed according to a preferred embodiment of the invention;

DETAILED DESCRIPTION OF THE DRAWINGS

Figure 2A:
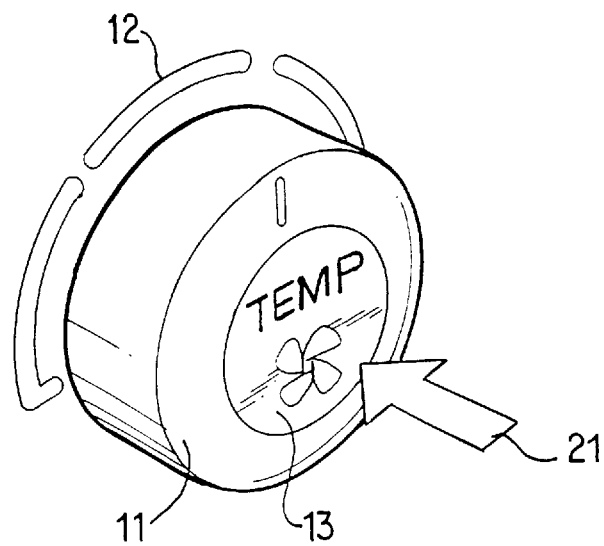
FIG. 2a is an enlarged schematic perspective view of a rotary-type knob arrangement of the control unit of FIG. 1, shown in the normal position for adjusting the temperature.

Reference number 1 indicates a so-called vehicle-borne monitor which is arranged in the dashboard of a motor vehicle. This vehicle-borne monitor 1 has different display and operating menus; that is, by way of this vehicle-borne monitor 1, the display of a radio 2 arranged next to the vehicle-monitor 1 can be shown as well as corresponding functions of the cassette player 3 situated above the radio 2. As known to a person skilled in the art, the vehicle-borne monitor 1 can contain various displays concerning the vehicle; for example, concerning the coolant temperature and the oil temperature of the internal-combustion engine driving the motor vehicle. As an alternative, the display of a traffic routing system can also be entered by way of a vehicle-borne monitor; also, the time can be displayed when the corresponding key 4 is operated. In addition, a radio telephone can be operated by way of a key 5 and its corresponding functions can be displayed by way of the vehicle-borne monitor 1. The various display and control menus can be selected by way of the menu key 6, whereas the different areas within the respective displayed field can be selected by means of an operating element 7 constructed in the manner of a rotary-type knob.

Below the unit of the vehicle-borne monitor 1 and the radio 2, a control panel 8 is provided which acts as a control unit for the vehicle heating or air-conditioning system. As few control elements, such as knobs, keys, rotary-type knobs and the like, as possible are arranged on this control panel 8 or on this control unit in order to ensure a simple, easily understandable operability for the vehicle occupants. Nevertheless, in addition to a selectable automatic program—for which the automatic-program key 9 is provided—an individual adjusting possibility for the temperature distribution and/or air distribution in different zones can be provided so that each vehicle occupant can adjust the climatic conditions which are optimal for that occupant. In addition to the automatic-program key 9, an individual key 10 is provided for this purpose. Furthermore, the automatic-program key 9 as well as the individual key 10 are provided twice on the control panel 8 so that different climatic conditions respectively can also be set for two different areas of the vehicle interior. As usual, these two different areas are the driver's side as well as the front passenger's side of the motor vehicle or of the normal passenger car.

Because of the individual division for the driver's side and for the front passenger's side, two rotary-type knobs 11 are also provided by means of which a desired temperature can be set in a prioritized manner in the above-mentioned different areas of the vehicle interior. For this purpose, a corresponding scale 12 is provided on each rotary-type knob 11. This scale reflects temperature values so that a desired temperature value can be set by means of this rotary-type knob 11. If the automatic program is selected; that is, the automatic-program key 9 is pressed, the vehicle occupant will merely have to indicate the desired temperature value by means of the rotary-type knob 11, according to which the automatic program will provide an optimal setting of the temperature distribution and of the air quantity distribution. When determining the air quantity, the automatic program particularly takes into account the actual temperature value in the vehicle interior.

Figure 2B:
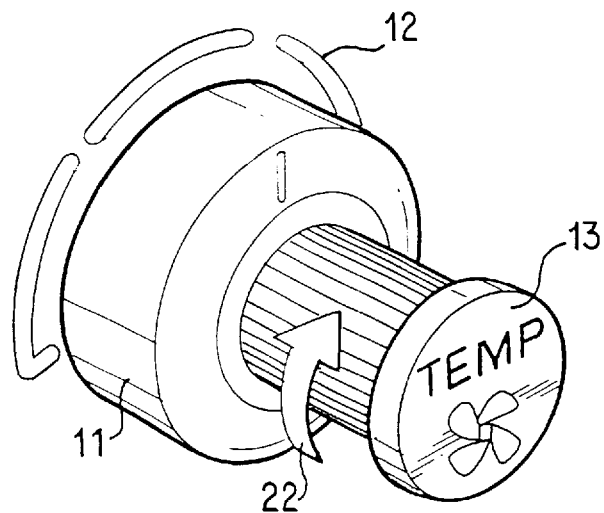
FIG. 2b is a view of this rotary-type knob arrangement of FIG. 2a in the position which permits the adjusting of the air quantity.

However, if a vehicle occupant desires an air quantity which differs from that indicated by the automatic program, he can adjust this different air quantity by means of an also provided rotary-type knob 13 for the air quantity. In its normal position, this rotary-type knob 13 is arranged in a quasi hidden manner; that is, the rotary type knob 13 is situated concentrically inside the rotary-type knob 11 and is normally arranged in a recessed manner in it, as indicated in FIG. 2a. By means of pressure exercised on this rotary knob 13 according to arrow 21, this rotary knob 13 can be brought into a position in which it projects out of the rotary-type knob 11, as indicated in FIG. 2b. Now the rotary-type knob 13 will be freely accessible so that, by means of a rotation according to arrow 22, the air quantity can be adjusted as desired, in which case, by means of the operation of this rotary-type knob 13, either the automatic program is rendered inoperative or is only trimmed. Then, the rotary-type knob 13 is returned by means of pressure into the recessed position according to FIG. 2a in the rotary-type knob 11. Now, the climatic adjustment takes place by means of an air quantity changed with respect to the automatic program, but the air distribution and temperature distribution in the different zones still takes place according to the indications of the automatic program. In this case, a return to the value indicated by the automatic program can take place either by operating the automatic-program key 9 or by synchronizing the rotary-type knob 13 for the air quantity with the respective air quantity value of the automatic program.

However, it should also be possible for the vehicle occupant to freely select the temperature distribution and/or air quantity distribution not only—as customary—with respect to the left and the right as well as possibly with respect to the forward and the rearward half of the vehicle interior of a passenger car but also with respect to different zones within this right or left possibly forward or rearward area. These zones may, for example, be the foot space or the zone in which the seat surface is situated or the zone of the chest as well as the zone in which normally the heads of the vehicle occupants are situated. In the symbolic representation 14 on the vehicle-borne monitor 1, which shows a sitting vehicle occupant, these individual zones are indicated by the Roman reference numbers I, II,III, IV. In this case, a separate zone section can be provided for each vehicle occupant; that is, an individual adjustment can be provided for "left forward", "right forward", "left rearward" and "right rearward" vehicle occupant positions.

The symbolic representation 14 appears after pressure is exercised on the individual key 10 on the vehicle-borne monitor 1. In addition, a bar chart 15 appears which symbolizes an approximate temperature value. For this purpose, this bar chart appears in two colors. The lighter area may be blue and stand for cold temperatures, while the darker area may be red and therefore indicate heat. A larger area of the blue field stands for colder temperatures, while a larger area of the red field symbolizes warmer temperatures.

After pressing the individual key 10, the individual adjustment can take place as follows:

By means of the control element 7, one of the four zones is selected, and the respective selected zone having a darker background is displayed. In the illustrated case of FIG. 1, zone I; that is, the foot space area is displayed with a darker background. For this momentarily selected zone, a desired temperature can now be individually set, specifically by turning the rotary-type knob 11. If the air quantity for this zone also is to be changed, this can take place by means of the rotary-type knob 13 after-as explained above-this knob has been brought into the position according to FIG. 2b. Merely by operating the individual key 10 as well as by subsequently selecting the desired zone by means of the operating element 7 and by then selecting the temperature by means of the rotary-type knob 11 (as well as optionally by operating the rotary-type knob 13 for the air quantity), the vehicle occupant can therefore set the climatic conditions desired by him if he is not satisfied with the set values of the automatic program. The shown and described system therefore permits a maximal individualization without the existence of a large number of control elements which are hard to understand and confusing. On the contrary, the number of control elements is small; and in most cases, the selection of an automatic program by operating the automatic-program key 9, possibly connected with a temperature selection by means of the rotary-type knob 11 will be sufficient.

On the whole, the above-described control unit for a vehicle heating or air-conditioning system therefore requires only a small number of control elements, which ensures an easy operation. In addition to the automatic key 9 as well as the individual key 10, two common keys 16 and 17, which are therefore familiar to any vehicle user, are provided for the window defrosting as well as for the electric rear window heating.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Control unit for a vehicle heating or air-conditioning system, comprising:

an operator selectable automatic program, an operator selectable individually adjustable air-conditioning parameter distribution program permitting adjustment of air-conditioning parameters including at least one of temperature and air quantity parameters in a plurality of different vehicle interior zones, and a vehicle borne display device permitting access to a plurality of different display and control menus, said display device including operator controllable displays and operator controllable switches for said automatic program and said individually adjustable program, wherein the plurality of different zones of the vehicle interior can be selected via a symbolic representation on the vehicle borne display device, and said different vehicle interior zones include individual zones defined with respect to a respective individual vehicle occupant.

2. Control unit according to claim 1, wherein the temperature is adjustable for the individual zones and the corresponding air quantity are adjusted by the automatic program.

3. Control unit according to claim 1, wherein said operator control switches include a first rotary knob for the temperature adjustment as well as a concentrically arranged second rotary knob which is normally recessed with respect to the first rotary knob and serves for control of the air quantity, said second rotary knob being selectively movable into a protruding position accommodating air quality control.

4. Control unit according to claim 3, wherein separate sets of said first and second separate rotary knobs for the temperature adjustment and air quantity adjustment are provided for different areas of the vehicle interior.

5. Control unit according to claim 2, wherein a separate division into said zones is provided for each of a plurality of vehicle occupants.

6. Control unit according to claim 5, wherein said separate division into said zones is provided for each of at least four vehicle occupants.

7. Control unit according to claim 1, wherein a separate division into said zones is provided for each of a plurality of vehicle occupants.

8. Control unit according to claim 7, wherein said separate division into said zones is provided for each of at least four vehicle occupants.

9. Control unit according to claim 7, wherein said operator control switches include a first rotary knob for the temperature adjustment as well as a concentrically arranged second rotary knob which is normally recessed with respect to the first rotary knob and serves for control of the air quantity, said second rotary knob being selectively movable into a protruding position accommodating air quality control.

10. Control unit according to claim 9, wherein separate sets of said first and second separate rotary knobs for the temperature adjustment and air quantity adjustment are provided for different areas of the vehicle interior.

11. Control unit according to claim 1, wherein said operator control switches include a first rotary knob for the temperature adjustment as well as a concentrically arranged second rotary knob which is normally recessed with respect to the first rotary knob and serves for control of the air quantity, said second rotary knob being selectively movable into a protruding position accommodating air quality control.

12. Control unit according to claim 11, wherein separate sets of said first and second separate rotary knobs for the temperature adjustment and air quantity adjustment are provided for different areas of the vehicle interior.

13. Control unit for a vehicle heating or air-conditioning system, comprising:

an operator selectable automatic program, an operator selectable individually adjustable air-conditioning parameter distribution program permitting adjustment of air-conditioning parameters including at least one of temperature and air quantity parameters in a plurality of different vehicle interior zones, and a vehicle borne display device permitting access to a plurality of different display and control menus, said display device including operator controllable displays and operator controllable switches for said automatic program and said individually adjustable program, wherein the plurality of different zones of the vehicle interior are selected with reference to a symbolic representation on the vehicle borne display device, which symbolic representation provides a visual indication on the display device for the selected zone, and at least one of said different vehicle interior zones includes individual zones defined with respect to a respective individual vehicle occupant.

14. Control unit for a vehicle heating or air-conditioning system, comprising:

an operator selectable automatic program, an operator selectable individually adjustable air-conditioning parameter distribution program permitting adjustment of air-conditioning parameters including at least one of temperature and air quantity parameters in a plurality of different vehicle interior zones, and a vehicle borne display device permitting access to a plurality of different display and control menus, said display device including operator controllable displays and operator controllable switches for said automatic program and said individually adjustable program, wherein a user selects the plurality of different vehicle interior zones of the symbolic representation using a control element, and at least one of said different vehicle interior zones includes individual zones defined with respect to a respective individual vehicle occupant.

* * * * *